US010798459B2

(12) United States Patent
Pomeroy et al.

(10) Patent No.: US 10,798,459 B2
(45) Date of Patent: *Oct. 6, 2020

(54) AUDIO/VIDEO SYSTEM WITH SOCIAL MEDIA GENERATION AND METHODS FOR USE THEREWITH

(71) Applicant: ViXS Systems, Inc., Toronto (CA)

(72) Inventors: John Pomeroy, Markham (CA); Xu Gang Zhao, Maple (CA); Sally Jean Daub, Toronto (CA)

(73) Assignee: VIXS SYSTEMS, INC., Toronto (CA)

( * ) Notice: Subject to any disclaimer, the term of this patent is extended or adjusted under 35 U.S.C. 154(b) by 1149 days.

This patent is subject to a terminal disclaimer.

(21) Appl. No.: 14/590,265

(22) Filed: Jan. 6, 2015

(65) Prior Publication Data
US 2015/0271558 A1    Sep. 24, 2015

Related U.S. Application Data

(63) Continuation-in-part of application No. 14/217,867, filed on Mar. 18, 2014, now abandoned, and a
(Continued)

(51) Int. Cl.
*H04N 21/4788* (2011.01)
*H04N 21/442* (2011.01)
(Continued)

(52) U.S. Cl.
CPC ..... *H04N 21/4788* (2013.01); *H04N 21/4223* (2013.01); *H04N 21/42201* (2013.01);
(Continued)

(58) Field of Classification Search
CPC ......... H04N 21/42201; H04N 21/4223; H04N 21/44218; H04N 21/44222; H04N 21/4788; H04N 21/4882
See application file for complete search history.

(56) References Cited

U.S. PATENT DOCUMENTS 6,585,521 B1   7/2003 Obrador
7,401,351 B2   7/2008 Boreczky et al.
(Continued)

FOREIGN PATENT DOCUMENTS

WO    2013152056 A1    10/2013

OTHER PUBLICATIONS

Zhang, et al.; An Integrated System for Content-Based Video Retrieval and Browsing; Pattern Recognition; pp. 643-658; vol. 30, No. 4; Apr. 1997.

*Primary Examiner* — Md N Haque
(74) *Attorney, Agent, or Firm* — Miller Nash Graham & Dunn LLP

(57) ABSTRACT

A user interest analysis generator analyzes input data corresponding to a viewing of the video program via the A/V player by at least one viewer, to determine a period of interest corresponding to the at least one viewer and to generate viewer interest data that indicates the period of viewer interest. A social media generator processes the viewer interest data and time coded metadata corresponding to the video program to automatically generate a social media post, corresponding to content of the video program during the period of interest, for posting to a social media account associated with the at least one viewer.

15 Claims, 10 Drawing Sheets

Related U.S. Application Data continuation-in-part of application No. 14/477,064, filed on Sep. 4, 2014, now abandoned.

(51) Int. Cl.
  *H04N 21/4223* (2011.01)
  *H04N 21/422* (2011.01)
  *H04N 21/488* (2011.01)
  *H04N 21/84* (2011.01)

(52) U.S. Cl.
  CPC . *H04N 21/44218* (2013.01); *H04N 21/44222* (2013.01); *H04N 21/4882* (2013.01); *H04N 21/84* (2013.01)

(56) References Cited

U.S. PATENT DOCUMENTS

| | | |
|---|---|---|
| 7,757,171 B1 | 7/2010 | Wong et al. |
| 7,877,676 B2 | 1/2011 | Munetsugu et al. |
| 7,984,089 B2 | 7/2011 | Gates et al. |
| 8,019,175 B2 | 9/2011 | Lee et al. |
| 8,364,698 B2 | 1/2013 | Delgo et al. |
| 8,874,301 B1 | 10/2014 | Rao et al. |
| 2002/0144259 A1 | 10/2002 | Gutta et al. |
| 2003/0052789 A1 | 3/2003 | Colmenarez et al. |
| 2003/0070182 A1 | 4/2003 | Pierre et al. |
| 2007/0109491 A1 | 5/2007 | Howell et al. |
| 2007/0271580 A1 | 11/2007 | Tischer et al. |
| 2008/0016544 A1 | 1/2008 | Lee et al. |
| 2008/0147608 A1 | 6/2008 | Sarukkai |
| 2008/0193016 A1 | 8/2008 | Lim et al. |
| 2009/0285545 A1 | 11/2009 | Bon |
| 2010/0004977 A1 | 1/2010 | Marci et al. |
| 2010/0095317 A1* | 4/2010 | Toebes ............... H04N 21/4667 725/9 |
| 2010/0107184 A1 | 4/2010 | Shintani |
| 2010/0162313 A1 | 6/2010 | Ruiz-Velasco et al. |
| 2010/0189408 A1* | 7/2010 | Itoh ................... H04N 21/47202 386/278 |
| 2012/0056847 A1 | 3/2012 | Milford |
| 2012/0066073 A1* | 3/2012 | Dilip ................. G06Q 30/0269 705/14.66 |
| 2013/0103814 A1* | 4/2013 | Carrasco ............. H04L 65/4092 709/223 |
| 2013/0165210 A1* | 6/2013 | Nelson ................ G07F 17/3225 463/25 |
| 2013/0166587 A1 | 6/2013 | Berry |
| 2013/0204825 A1* | 8/2013 | Su ........................... G06N 5/04 706/46 |
| 2013/0232515 A1 | 9/2013 | Rivera et al. |
| 2013/0279603 A1 | 10/2013 | Li et al. |
| 2014/0032468 A1* | 1/2014 | Anandaraj ............ G06Q 30/02 706/46 |
| 2014/0067825 A1* | 3/2014 | Oztaskent ........... G06F 16/9535 707/748 |
| 2014/0095504 A1* | 4/2014 | Soroushian ............. G06F 16/16 707/737 |
| 2014/0149177 A1 | 5/2014 | Frank et al. |
| 2014/0181667 A1 | 6/2014 | Chen et al. |
| 2014/0244532 A1* | 8/2014 | Budzienski ........ G06Q 10/1053 705/321 |
| 2014/0280551 A1* | 9/2014 | Byrd Vallieres de St. Real ......... H04L 67/22 709/204 |
| 2014/0282681 A1 | 9/2014 | Carney et al. |
| 2014/0359647 A1* | 12/2014 | Shoemake ....... H04N 21/44222 725/10 |
| 2014/0372424 A1 | 12/2014 | Markov et al. |
| 2015/0178915 A1 | 6/2015 | Chatterjee et al. |
| 2015/0281824 A1 | 10/2015 | Nguyen et al. |
| 2015/0350729 A1* | 12/2015 | Reynolds ......... H04N 21/47217 725/34 |

* cited by examiner

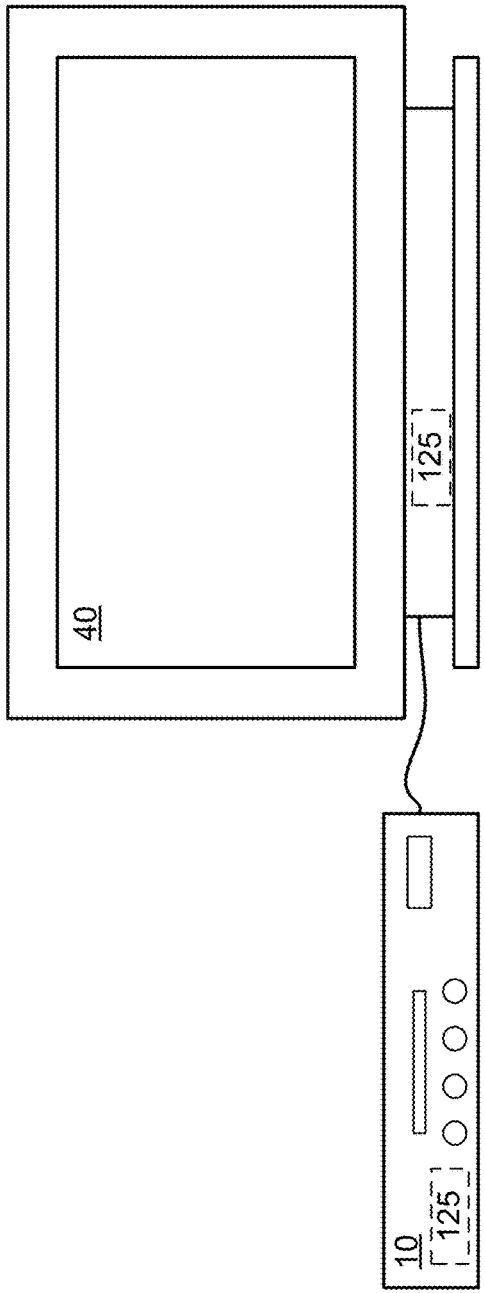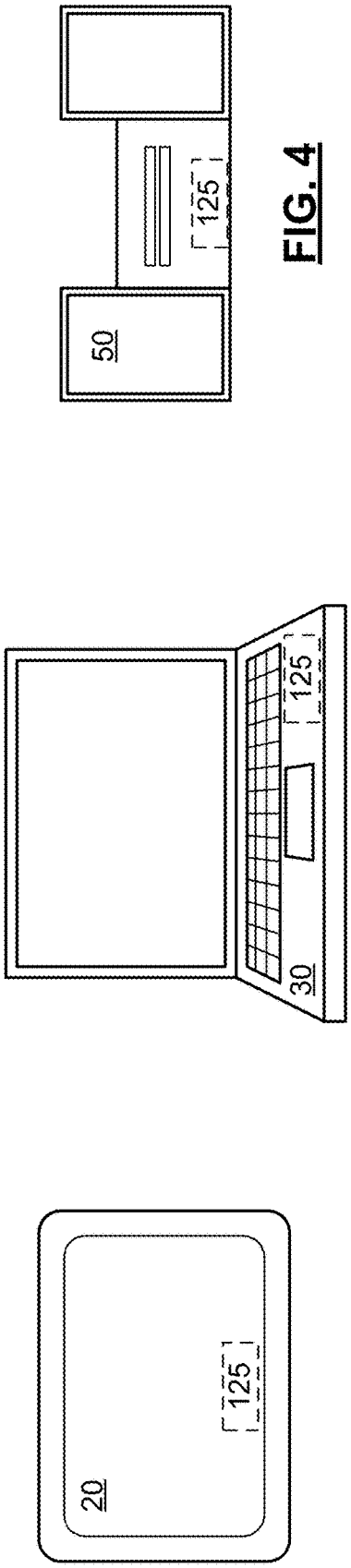

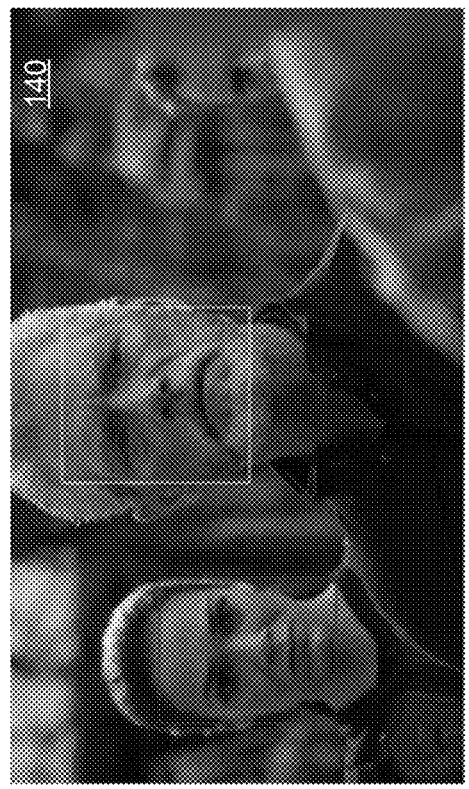
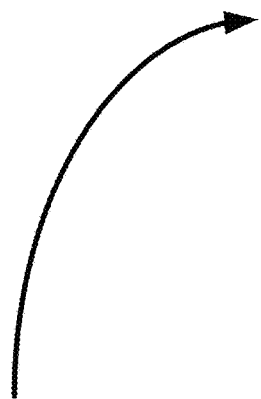
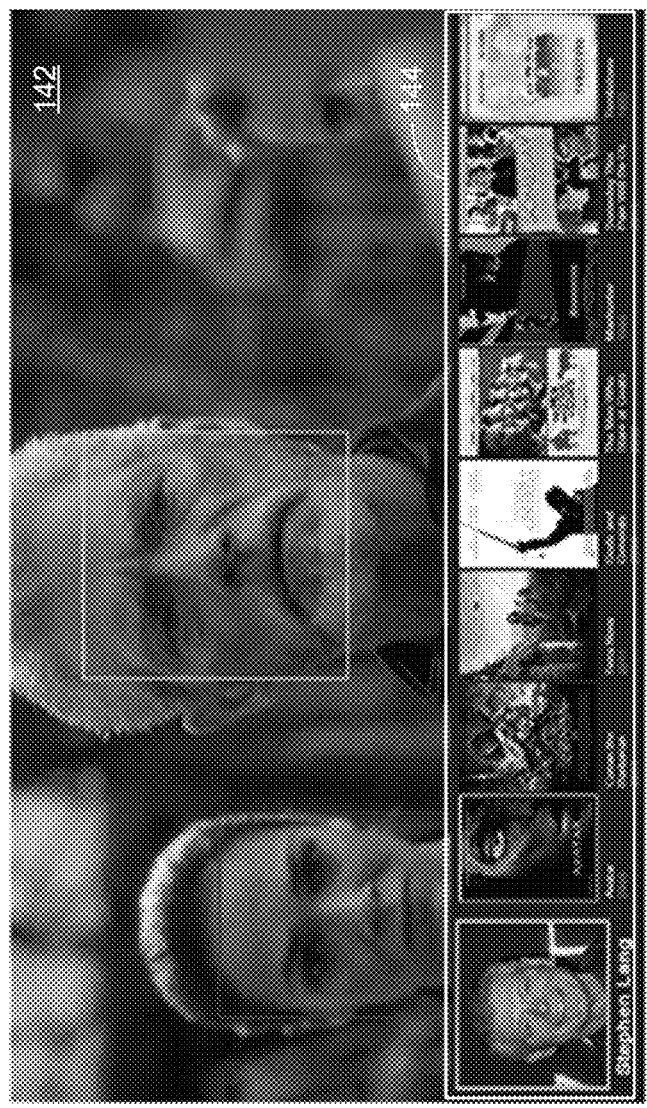
FIG. 6

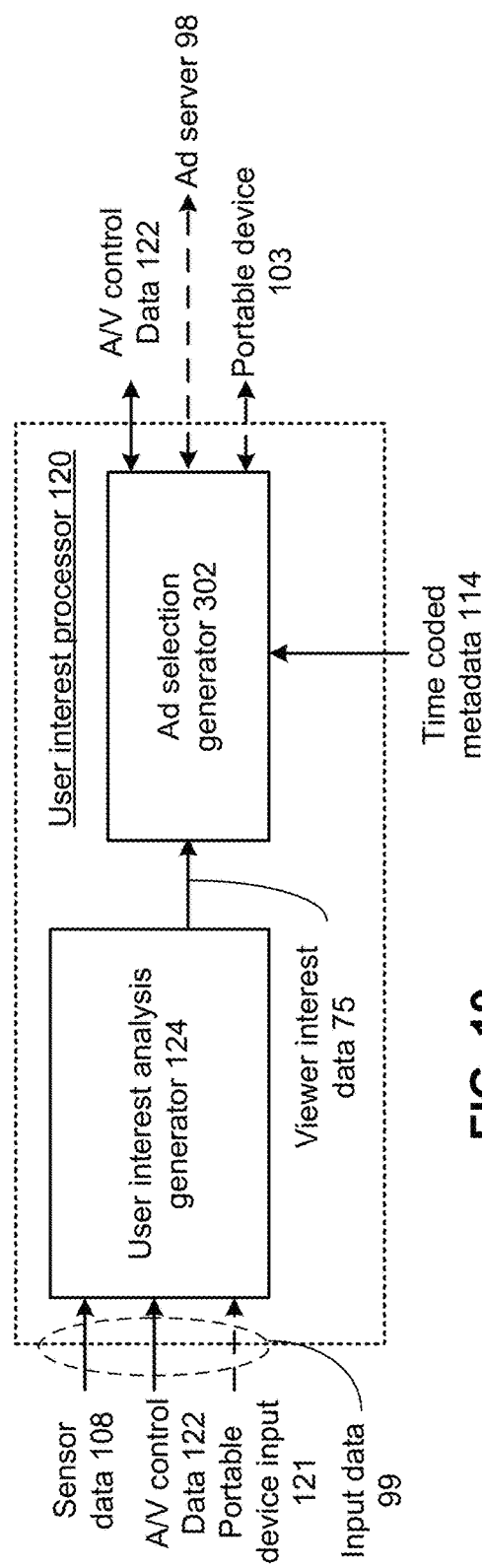
FIG. 19
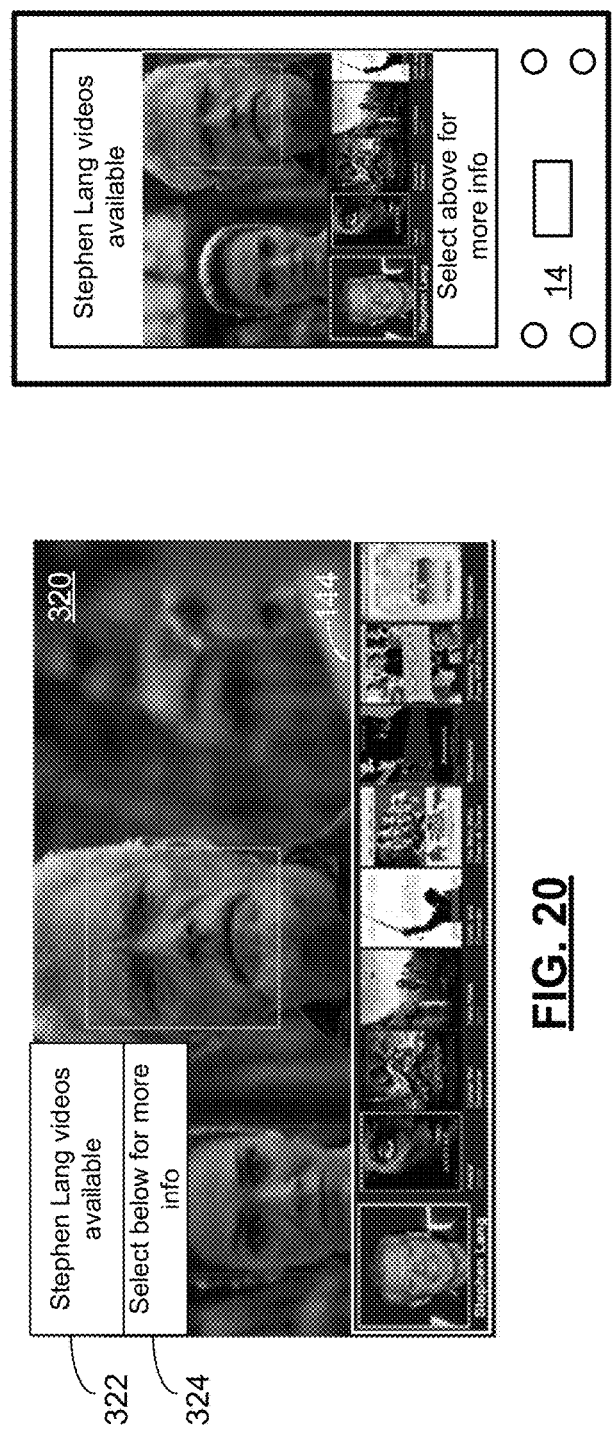
FIG. 20
FIG. 21

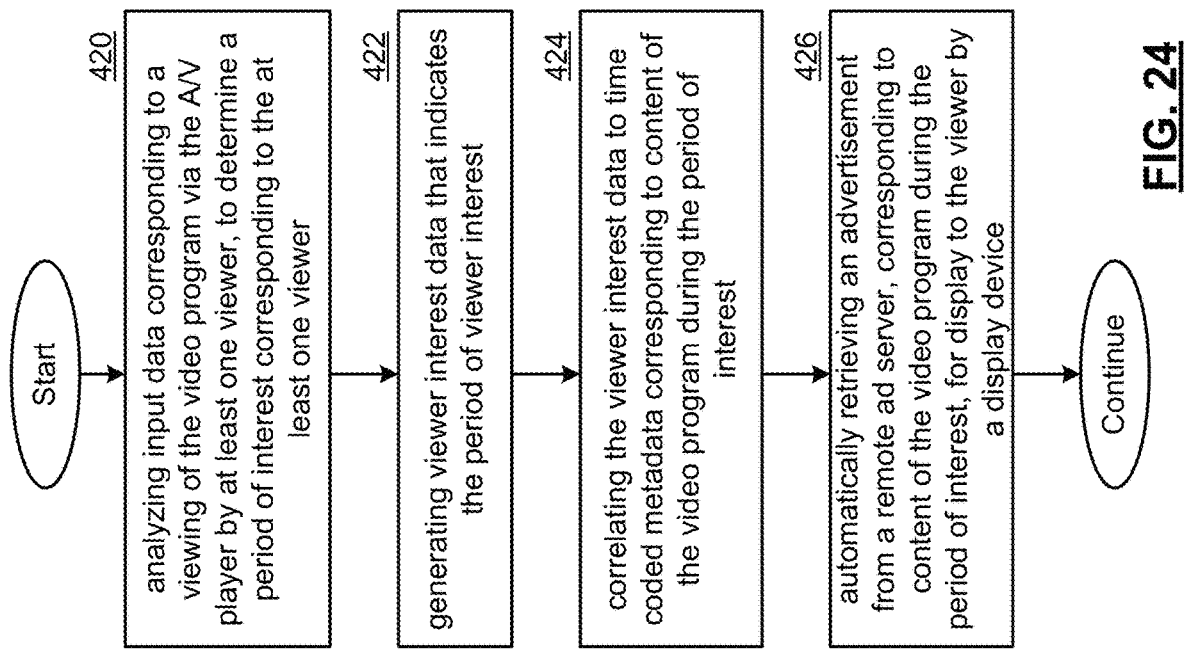

AUDIO/VIDEO SYSTEM WITH SOCIAL MEDIA GENERATION AND METHODS FOR USE THEREWITH

CROSS REFERENCE TO RELATED PATENTS

The present U.S. Utility Patent Application claims priority pursuant to 35 U.S.C. § 120 as a continuation-in-part of U.S. Utility application Ser. No. 14/217,867, entitled "AUDIO/VIDEO SYSTEM WITH USER ANALYSIS AND METHODS FOR USE THEREWITH", filed Mar. 18, 2014, and claims priority pursuant to 35 U.S.C. § 120 as a continuation-in-part of U.S. Utility application Ser. No. 14/477,064, entitled "VIDEO SYSTEM FOR EMBEDDING EXCITEMENT DATA AND METHODS FOR USE THEREWITH", filed Sep. 4, 2014, both of which are hereby incorporated herein by reference in their entirety and made part of the present U.S. Utility Patent Application for all purposes.

TECHNICAL FIELD

The present disclosure relates to audio/video systems that process and present audio and/or display video signals.

DESCRIPTION OF RELATED ART

Modern users have many options to view audio/video programming. Home media systems can include a television, a home theater audio system, a set top box and digital audio and/or A/V player. The user typically is provided one or more remote control devices that respond to direct user interactions such as buttons, keys or a touch screen to control the functions and features of the device.

Audio/video content is also available via a personal computer, smartphone or other device. Such devices are typically controlled via a buttons, keys, a mouse or other pointing device or a touch screen.

BRIEF DESCRIPTION OF THE SEVERAL VIEWS OF THE DRAWINGS

FIGS. 1-4 present pictorial diagram representations of various video devices in accordance with embodiments of the present disclosure.

FIG. 6 presents a pictorial representation of screen displays in accordance with an embodiment of the present disclosure.

FIG. 19 presents a block diagram representation of a user interest processor in accordance with an embodiment of the present disclosure.

FIG. 20 presents a pictorial representation of a screen display in accordance with an embodiment of the present disclosure.

FIG. 21 presents a pictorial representation of a screen display in accordance with an embodiment of the present disclosure.

FIG. 24 presents a flowchart representation of a method in accordance with an embodiment of the present disclosure.

DETAILED DESCRIPTION

FIGS. 1-4 present pictorial diagram representations of various video devices in accordance with embodiments of the present disclosure. In particular, device 10 represents a set top box with or without built-in digital video recorder functionality or a stand-alone digital video player such as an internet video player, Blu-ray player, digital video disc (DVD) player or other video player. Device 20 represents a tablet computer, smartphone or other communications device. Device 30 represents a laptop, netbook or other portable computer. Device 40 represents a video display device such as a television or monitor. Device 50 represents an audio player such as a compact disc (CD) player, a MP3 player or other audio player.

The devices 10, 20, 30, 40 and 50 each represent examples of electronic devices that incorporate one or more elements of a system 125 that includes features or functions of the present disclosure. While these particular devices are illustrated, system 125 includes any device or combination of devices that is capable of performing one or more of the functions and features described in conjunction with FIGS. 5-24 and the appended claims.

Figure 5:
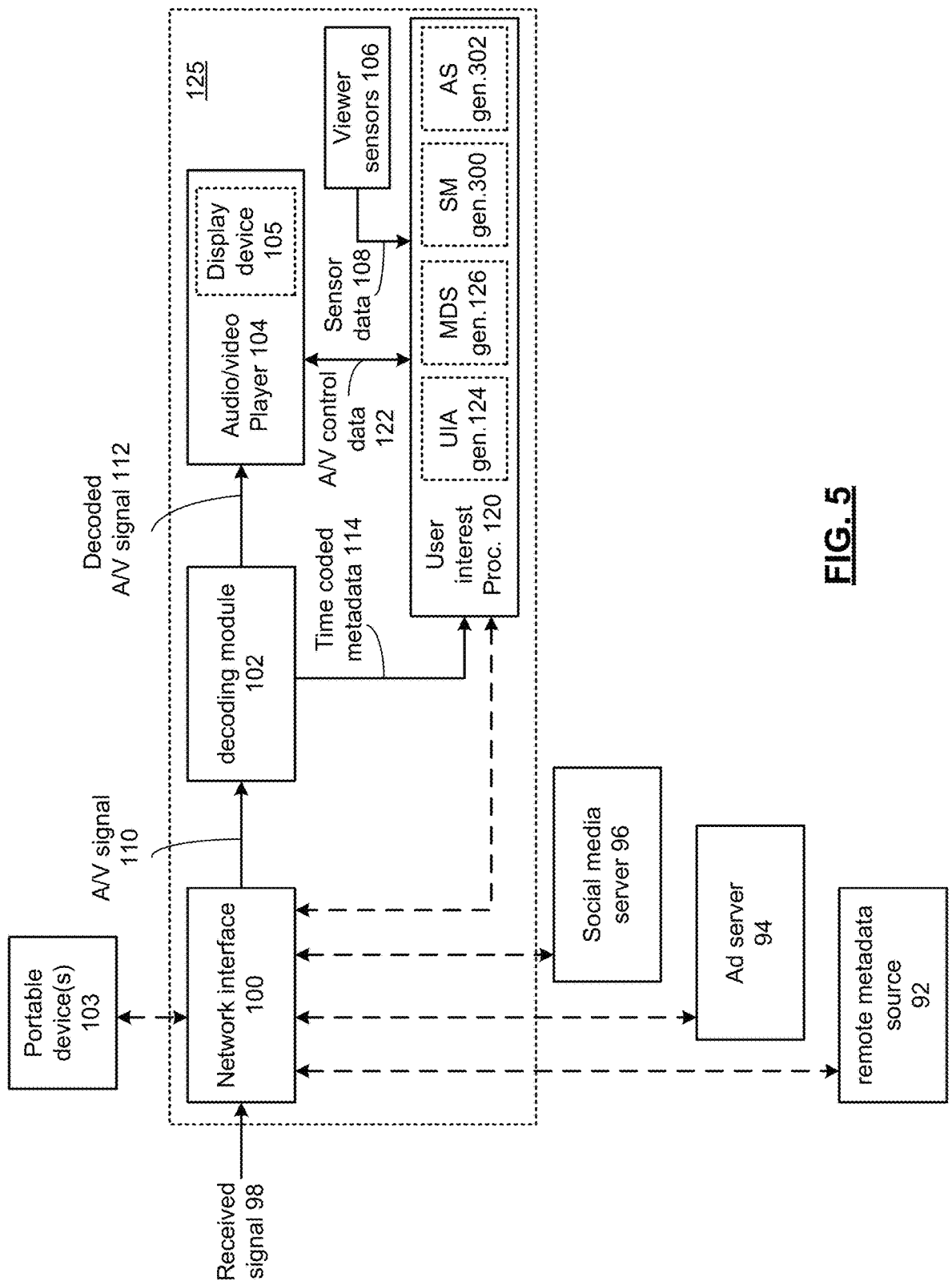
FIG. 5 presents a block diagram representation of a system in accordance with an embodiment of the present disclosure.

FIG. 5 presents a block diagram representation of a system in accordance with an embodiment of the present disclosure. In an embodiment, this system 125 includes a network interface 100, such as a television receiver, cable television receiver, satellite broadcast receiver, broadband modem, a Multimedia over Coax Alliance (MoCA) interface, Ethernet interface, local area network transceiver, Bluetooth, 3G or 4G transceiver and/or other information receiver or transceiver or network interface that is capable of receiving a received signal 98 and extracting one or more audio/video signals 110. In addition to receiving video signal 98, the network interface 100 can provide an Internet connection, local area network connection or other wired or wireless connection to social media server 96, ad server 94, remote metadata source 92, as well as one or more portable device 103 such as tablets, smart phones, lap top computers or other portable devices. While shown as a single device, network interface 100 can be implemented by two or more separate devices, for example, to receive the received signal 98 via one network and to communicate with portable devices 103 and social media server 96, ad server 94, remote metadata source 92 via one or more other networks.

The received signal 98 can be a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Received signal 98 can include a compressed digital video signal complying with a digital video codec standard such as H.264, MPEG-4 Part 10 Advanced Video Coding (AVC), VC-1, H.265, or another digital format such as a Motion Picture Experts Group (MPEG) format (such as MPEG1, MPEG2 or MPEG4), QuickTime format, Real Media format, Windows Media Video (WMV) or Audio Video Interleave (AVI), etc. When the received signal 98 includes a compressed digital video signal, a decoding module 102 or other video codec decompresses the audio/video signal 110 to produce a decoded audio/video signal 112 suitable for display by a video display device of audio/video player 104 that creates an optical image stream either directly or indirectly, such as by projection.

In addition or in the alternative embodiment, the received signal 98 can include an audio component of a video signal, a broadcast audio signal, such as a radio signal, high definition radio signal or other audio signal that has been transmitted over a wireless medium, either directly or through one or more satellites or other relay stations or through a cable network, optical network or other transmission network. In addition, received signal 98 can be an audio component of a stored video file or streamed video signal, an MPEG3 (MP3) or other digital audio signal generated from a stored audio file, played back from a recording medium such as a magnetic tape, magnetic disk or optical disk, and can include a streaming audio signal that is transmitted over a public or private network such as a local area network, wide area network, metropolitan area network or the Internet.

When the received signal 98 includes a compressed digital audio signal, the decoding module 102 can decompress the audio/video signal 110 and otherwise process the audio/video signal 110 to produce a decoded audio signal suitable for presentation by an audio player included in audio/video player 104 and further to extract time-coded metadata 114 that indicates the content of the video program at various times. The decoded audio/video signal 112 can include a high definition media interface (HDMI) signal, digital video interface (DVI) signal, a composite video signal, a component video signal, an S-video signal, and/or one or more analog or digital audio signals.

When A/V signal 110 is received as digital video and the decoded video signal 112 is produced in a digital video format, the digital video signal may be optionally scrambled or encrypted, may include corresponding audio and may be formatted for transport via one or more container formats. Examples of such container formats are encrypted Internet Protocol (IP) packets such as used in IP TV, Digital Transmission Content Protection (DTCP), etc. In this case the payload of IP packets contain several transport stream (TS) packets and the entire payload of the IP packet is encrypted. Other examples of container formats include encrypted TS streams used in Satellite/Cable Broadcast, etc. In these cases, the payload of TS packets contain packetized elementary stream (PES) packets. Further, digital video discs (DVDs) and Blu-Ray Discs (BDs) utilize PES streams where the payload of each PES packet is encrypted. When the received signal 98 is scrambled or encrypted, the decoding module 102 further operates to descramble and/or decrypt the received signal 98 to produce the decoded audio/video signal 112.

In an embodiment, the decoding module 102 not only decodes the A/V signal 110 but also includes a pattern recognition module to detect patterns of interest in the video signal and to generate time-coded metadata 114 that indicates patterns and corresponding features, such as people, objects, places, activities or other features as well as timing information that correlates the presence or absence of these people, objects, places, activities or other features in particular images in the decoded A/V signal 112. Examples of such a decoding module 102 is presented in conjunction with the U.S. Published Application 2013/0279603, entitled, VIDEO PROCESSING SYSTEM WITH VIDEO TO TEXT DESCRIPTION GENERATION, SEARCH SYSTEM AND METHODS FOR USE THEREWITH, the contents of which are incorporated herein by reference for any and all purposes. In addition or in the alternative, the decoding module 102 extracts time coded metadata 114 that was already included in the A/V signal 110. For example, the A/V signal 110 can have the time coded metadata 114 embedded as a watermark or other signal in the video content itself, or be in some different format that includes the video content from the received signal 98 and the time-coded metadata 114.

The system 125 includes a user interest processor 120 for use with the audio/video (A/V) player 104 that is playing a video program included in the decoded A/V signal 112. In particular, the user interest processor 120 includes a user interest analysis (UIA) generator 124 configured to analyze input data corresponding to the viewing of the video program via the A/V player 104 by one or more viewers. The input data can be sensor data 108 generated by one or more viewer sensors 106, A/V commands and/or other A/V control data 122 from the A/V player 104, input data received from one or more portable devices 103. The UIA generator 124 analyzes the input data to determine a period of interest corresponding to a viewer, to viewers collectively or to a group of viewers individually and generates viewer interest data that indicates these periods of viewer interest. The metadata selection (MDS) generator 126 of the user interest processor 120 is configured to process the viewer interest data and time coded metadata 114 corresponding to the video program, and selects portions of the time coded metadata 114 corresponding to content of the video program during the period of interest, for display to the viewer by a display device, such as the display device 105 associated with the A/V player 104 player. For example, the display device 105 can concurrently display at least a portion of the video program in conjunction with the selected portions of the time coded metadata in a split screen mode, as a graphical or other media overlay or in other combinations.

In addition or in the alternative, the select portions of the time coded metadata can be displayed on a display device associated with one or more portable devices 103 associated with the viewer or viewers—separately from the A/V player 104. Consider an example where the system 125 is implemented via a set top box and television with an associated cable connection. In addition, the network interface 100 of the system 125 further includes a cable modem with MoCA and WiFi capability that can communicate with the set top box via WiFi or MoCA, with the portable devices 103 via WiFi either directly or via a MoCA bridge device, and with social media server 96, ad server 94, and remote metadata source 92 via the internet. In this fashion, a family viewing a video program on the television associated with the set top box can view the select portions of the time coded metadata 114 via the portable devices 103 that are held by the family members.

In an embodiment, the user interest processor operates based on input data that includes image data in a presentation area of the A/V player 104. For example, a viewer sensor 106 generates sensor data 108 in a presentation area of the A/V player 104. The viewer sensor 106 can include a digital camera such as a still or video camera that is either a stand-alone device, or is incorporated in any one of the devices 10, 20, 30 or 40 or other device that generates sensor data 108 in the form of image data. In addition or in the alternative, the viewer sensor 106 can include an infrared sensor, thermal imager, background temperature sensor or other thermal sensor, an ultrasonic sensor or other sonar-based sensor, a proximity sensor, an audio sensor such as a microphone, a motion sensor, brightness sensor, wind speed sensor, humidity sensor, one or more biometric sensors and/or other sensors for generating sensor data 108 that can be used by the user interest analysis generator 124 for determining the presence of viewers, for identifying particular viewers, for characterizing their activities and/or for determining that one or more viewers are currently interested in the content of the video program and for generating viewer interest data in response thereto.

Consider again an example where a family is watching TV. One or more video cameras are stand-alone devices or are built into the TV, a set top, Blu-Ray player, or mobile devices associated with the users. The camera or cameras capture video of the presentation environment and users. The system 125 processes the video and detects if there are viewers present, how many viewers are present, the identities of each of the viewers and further the activities engaged in by each of the viewers to determine period of interest by each of the viewers. In particular, the system 125 determines which users are watching closely and are interested in or excited by what is being shown, from what angles they are watching, which users are not watching closely or engaged in a conversation, which users are not watching at all, and which users are asleep, etc.

In an embodiment, the user interest analysis generator 124 determines a period of interest corresponding to one or more viewers based on facial modeling and recognition that the at least one viewer has a facial expression corresponding to interest. In addition, the input data can include audio data from a viewer sensor 106 in the form of a microphone included in a presentation area of the A/V player 104. The user interest analysis generator 124 can determine a period of interest corresponding to the at least one viewer based on recognition that utterances by the at least one viewer correspond to interest. An excited voice from a user can indicate interest, while a side conversation unrelated the video content or snoring can indicate a lack of interest.

In another embodiment, the input data can include A/V control data 122 that includes commands from the A/V player 122 such as a pause command or a specific user interest command that is generated in response to commands issued by a user via a user interface of the A/V player 104. The user interest analysis generator 124 can determine a period of interest based on pausing of the video, and/or in response to a specific user indication of interest via another command. For example, when a viewer is interested with an actor/actress playing in a video and pauses the video, input data in the form of A/V control data 122 is presented to the user interest processor 120, the user interest analysis generator 124 detects the pause command and indicates a period of interest. The metadata selection generator 126 analyzes the time coded metadata 114 to determine the actors or actresses that are currently shown in the paused scene of the video program. As previously discussed the time coded metadata 114 can be generated by the decoding module 102 operating to automatically recognize the actor/actress in the video program at this point or based on other time coded metadata 114 extracted from the decoded A/V data. The metadata selection generator 126 can then select information pertaining to the actor/actress in the video program at this point such as his/her profile and starred films. This selected metadata can be passed to the A/V player 104 as A/V control data for display on the display device 105 and/or passed to one or more portable devices 103 via network interface 100.

In another embodiment, the input data includes sensor data 108 from at least one biometric sensor associated with the viewer or viewers. The user interest analysis generator 124 determines a period of interest corresponding to the viewer or viewers based on recognition that the sensor data 108 indicates interest of the viewer or viewers. Such biometric sensor data 108 in response to, or that otherwise indicates, the interest of the user—in particular, the user's interest associated with the display of the video program by the A/V player 104. In an embodiment, the user interest analysis generator 124 generate viewer interest data that indicates the periods of interest either ion an individual viewer basis or collectively based on interest by any, all or a majority of viewers that are present. The metadata selection generator 126 correlates the periods of interest of the viewer or viewers to the specific content of the video program of decoded A/V data 112 that is being displayed at that time in order to select time coded metadata 114 for display. In circumstances where the selected metadata is passed to one or more portable devices 103 via network interface 100, individual interest on the part of a single user can trigger the selected time coded metadata 114 to be sent to only the viewer or viewers that are showing interest at the time.

In an embodiment, the viewer sensors 106 can include an optical sensor, resistive touch sensor, capacitive touch sensor or other sensor that monitors the heart rate and/or level of perspiration of the user. In these embodiments, a high level of interest can be determined by the user interest analysis generator 124 based on a sudden increase in heart rate or perspiration.

In an embodiment, the viewer sensors 106 can include a microphone that captures the voice of the user and/or voices or others in the surrounding area. In these cases the voice of the user can be analyzed by the user interest analysis generator 124 based on speech patterns such as pitch, cadence or other factors and/or cheers, applause or other sounds can be analyzed to detect a high level of interest of the user or others.

In an embodiment, the viewer sensors 106 can include an imaging sensor or other sensor that generates a biometric signal that indicates a dilation of an eye of the user and/or a wideness of opening of an eye of the user. In these cases, a high level of user interest can be determined by the user interest analysis generator 124 based on a sudden dilation of the user's eyes and/or based on a sudden widening of the eyes. It should be noted that multiple viewer sensors 106 can be implemented and the user interest analysis generator 124 can generate interest data based on an analysis of the sensor data 108 from each of multiple viewer sensors 106. In this fashion, periods of time corresponding to high levels of interest can be more accurately determined based on multiple different criteria.

Consider an example where a family is watching a soccer game. A sudden increase in heart rate, perspiration, eye wideness, pupil dilation, smile, changes in voice and spontaneous cheers, may together or separately indicate that one or more particular viewers have suddenly become highly interested—for example when a player scores a goal. This period of interest can be used to select portions of time coded metadata associated with the particular player that scored the goal and be presented for display to all the viewers via the display device 105 or only to the particular viewer or viewers showing interest via portable device(s) 103 associated with these viewer(s).

It should be noted that while the sensor data 108 has been primarily described as coming from standalone sensors 106, sensors in a portable device or devices 103 in communication with network interface 100 and associated with one or more viewers can also be used to generate any of the input data previously described and further to associate periods of viewer interest with particular viewers. Other input data can be generated by portable devices 103 for use by user interest analysis generator 124. Consider a case where the portable device 103 includes an application or app such as a social media application, a browser application, or a media database application, that is downloaded to the portable device 103 and executed by the user/viewer. Input data can be generated by one or more of these apps to indicate user/viewer interest. In particular interest in a video can inspire someone to use a portable device and go looking for related topics on the Internet. The portable device may not be directly linked to the video and this may be interpreted as either interest or disinterest depending on the content of the information being accessed. For example, if a viewer is watching a movie and searching for an actor in a media database application such as IMDB or via a web browser, this portable device input data can be used by the user interest analysis generator 124 to indicate a period of interest and time coded metadata corresponding to the actor can be selected for display. In a similar fashion, a viewer that is generating a Facebook post or Twitter tweet regarding a particular actor can be used in determining a period of interest for that particular user/viewer. In the alternative, accessing unrelated information on the Internet, playing an unrelated game or engaging in other unrelated activities can generate portable device input data that can be used by the user interest analysis generator 124 to indicate a period of disinterest. In addition to receiving portable device input data from the device itself, in an embodiment other methods of monitor browsing traffic or other input data can be employed such as monitoring activity and receiving portable device input data through a home gateway, a remote server or other device.

In a further embodiment, the metadata selection generator 126 is further configured to retrieve additional metadata 115 from a remote metadata source 92 via the network interface 100. In this fashion, keywords or other basic information included in the time-coded metadata 114 can be used to search and retrieve additional metadata 115. For example, time coded metadata that indicates the name of an actor in a current scene can be used to search for further information on the actor such as other roles, personal information, movies for purchase, recommended biographies, etc.

In an embodiment, the user interest processor 120 further includes a social media generator 300 configured to process viewer interest data and time coded metadata 114 corresponding to the video program to automatically generate a social media post, corresponding to content of the video program during the period of interest, for posting to a social media account associated with the at least one viewer. In one mode of operation, the user interest processor 120 responds to periods of interest and communicates via network interface 100 with a social media server 96 to automatically generate posts relating to the content of video program that correlates to the viewer interest. The social media generator 300 can forward the social media post to the social media server 96 via the network interface 100, in response to user input that indicates that the social media post is accepted by the at least one viewer.

In an embodiment, the social media post is presented on the display device 105 associated with the A/V player 104 and wherein the display device concurrently displays at least a portion of the video program in conjunction with the social media post. In addition or in the alternative, the social media post is presented on a display device associated with a portable device 103 associated with the at least one viewer. The portable device 103 can itself forward the social media post to a social media server, in response to a user input that indicates that the social media post is accepted by the at least one viewer.

In an embodiment, the user interest processor 120 further includes an ad selection generator 302 configured to process the viewer interest data and time coded metadata 114 corresponding to the video program to automatically retrieve an advertisement from a remote ad server 94, corresponding to content of the video program during the period of interest, for display to the viewer by a display device, such as display device 105 or a display device of a portable device 103.

The decoding module 102, A/V player 104 and the user interest processor 120 can each be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. These memories may each be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when decoding module 102, A/V player 104 and the user interest processor 120 implement one or more of their functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

While system 125 is shown as an integrated system, it should be noted that the system 125 can be implemented as a single device or as a plurality of individual components that communicate with one another wirelessly and/or via one or more wired connections. The further operation of video system 125, including illustrative examples and several optional functions and features is described in greater detail in conjunction with FIGS. 6-24 that follow.

FIG. 6 presents a pictorial representation of screen displays in accordance with an embodiment of the present disclosure. In particular, screen displays generated in conjunction with a system, such as system 125, are described in conjunction with functions and features of FIG. 5 that are referred to by common reference numerals.

In this example, during a scene of a video program depicted in screen display 140, the user interest analysis generator 124 determines a period of interest based on input data. The metadata selection generator 126 analyzes the time coded metadata 114 to determine the actors or actresses that are currently shown in the paused scene of the video program. In example shown, the actor Stephen Lang is identified based the time coded metadata 114. The metadata selection generator 126 then selects and/or retrieves information pertaining to his other films. This selected metadata can be passed to the A/V player 104 as A/V control data 122 for display 142 on the display device 105 in region 144.

Figure 7:
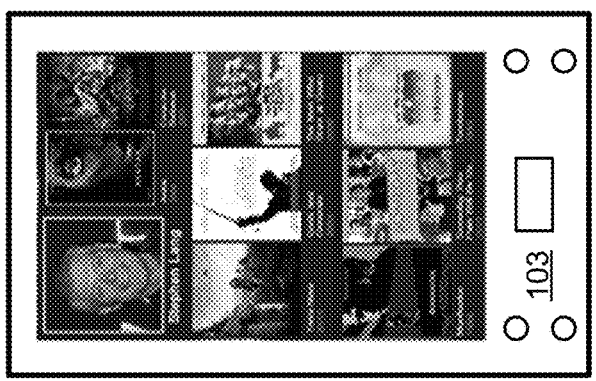
FIG. 7 presents a pictorial representation of a screen display in accordance with an embodiment of the present disclosure.

FIG. 7 presents a pictorial representation of a screen display in accordance with an embodiment of the present disclosure. In particular, a screen display generated in conjunction with a system, such as system 125, is described in conjunction with functions and features of FIG. 5 that are referred to by common reference numerals.

In this example, during a scene of a video program, the user interest analysis generator 124 determines a period of interest based on input data. The metadata selection generator 126 analyzes the time coded metadata 114 to determine the actors or actresses that are currently shown in the paused scene of the video program. In example shown, the actor Stephen Lang is identified based the time coded metadata. The metadata selection generator 126 then selects and/or retrieves information pertaining to his other films. This selected metadata can be passed to network interface 100 for display on the display device of portable device 103, such as the tablet shown.

Figure 8:
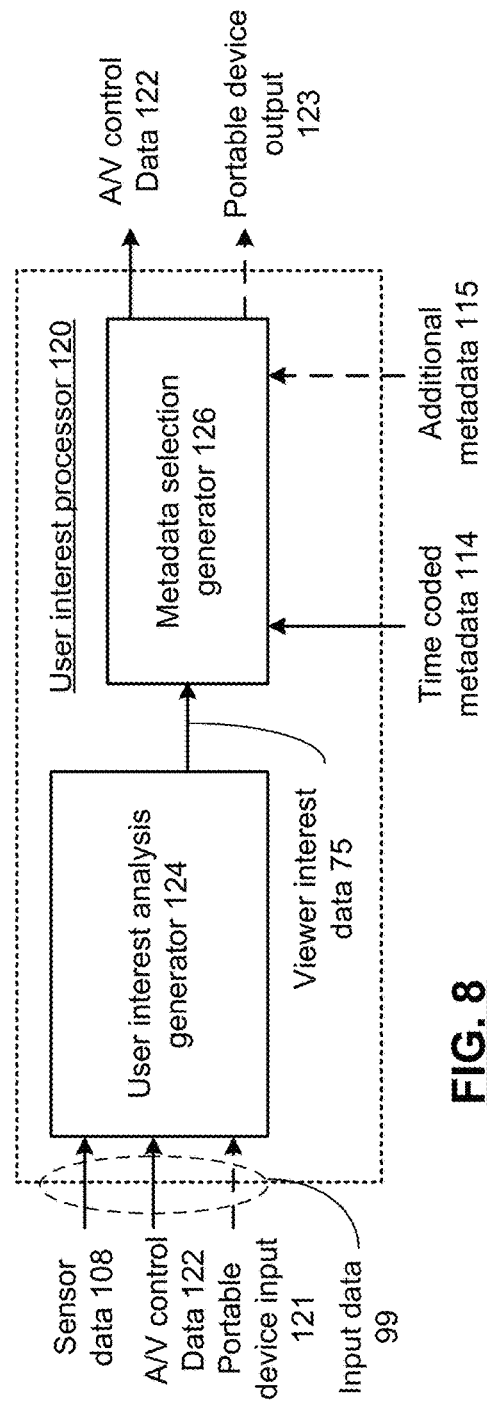
FIG. 8 presents a block diagram representation of a user interest processor in accordance with an embodiment of the present disclosure.

FIG. 8 presents a block diagram representation of a user interest processor in accordance with an embodiment of the present disclosure. In particular, a block diagram is presented in conjunction with a system, such as system 125, that is described in conjunction with functions and features of FIG. 5 referred to by common reference numerals.

The user interest processor 120 includes a user interest analysis (UIA) generator 124 configured to analyze input data 99 corresponding to the viewing of the video program via the A/V player 104 by one or more viewers. The input data 99 can include sensor data 108 generated by one or more viewer sensors 106, A/V commands and/or other A/V control data 122 from the A/V player 104, and/or portable device input 121 received from one or more portable devices 103. The UIA generator 124 analyzes the input data 99 to determine a period of interest corresponding to viewer or viewers and generate viewer interest data 75 that indicates this period of viewer interest. The metadata selection (MDS) generator 126 of the user interest processor 120 is configured to process the viewer interest data 75 and time coded metadata 114 corresponding to the video program, and to select portions of the time coded metadata 114 corresponding to content of the video program during the period of interest optionally in conjunction with additional metadata 115 retrieved from a remote metadata source 92. This selected metadata is output as A/V control data 122 for display to the viewer by a display device, such as the display device 105 associated with the A/V player 104 player. In addition or in the alternative, the select portions of the time coded metadata 114 and additional metadata 115 can be output as secondary device output 123 for display on a display device associated with one or more portable devices 103 associated with the viewer or viewers—separately from the A/V player 104.

Figure 9:
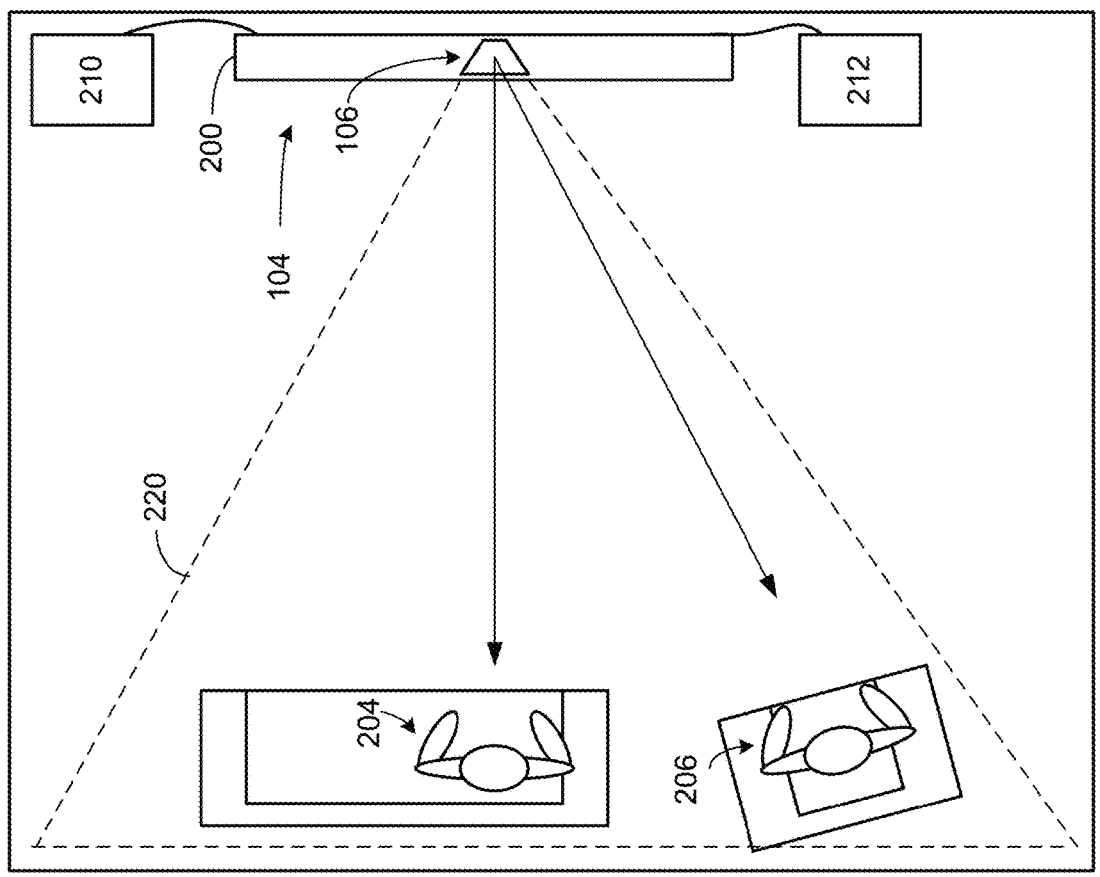
FIG. 9 presents a pictorial representation of a presentation area in accordance with an embodiment of the present disclosure.

FIG. 9 presents a pictorial representation of a presentation area in accordance with an embodiment of the present disclosure. In particular, the use of an example system 125 presented in conjunction with FIG. 5 is shown.

In this example, a viewer sensor 106 generates sensor data 108 in a presentation area 220 of the A/V player 104. The A/V player 104 includes a flat screen television 200 and speakers 210 and 212. The viewer sensor 106 can include a digital camera such as a still or video camera that is either a stand-alone device, or is incorporated in the flat screen television 200 and that generates sensor data 108 that includes image data. The user interest analysis generator 124 analyzes the sensor data 108 to detect and recognize the users 204 and 206 of the A/V player 104 and their level of interest in the current video content being displayed.

Figure 10:
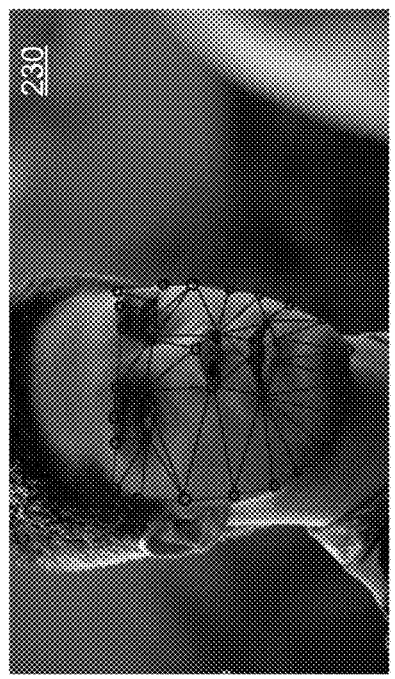
FIG. 10 presents a pictorial representation of a video image in accordance with an embodiment of the present disclosure.

FIG. 10 presents a pictorial representation of a video image in accordance with an embodiment of the present disclosure. In particular, a screen display 230 generated in conjunction with a system, such as system 125, is described in conjunction with functions and features of FIG. 5 that are referred to by common reference numerals.

In an embodiment, the user interest analysis generator 124 determines a period of interest corresponding to one or more viewers based on facial modeling and recognition that the at least one viewer has a facial expression corresponding to interest. The user interest analysis generator 124 analyzes the sensor data 108 to generate A/V control data 122. In an embodiment, the user interest analysis generator 124 analyzes the sensor data 108 to determine a number of users that are present, the locations of the users, the viewing angle for each of the users and further user activities that indicate, for example, the user's level of interest in the audio or video content being presented or otherwise displayed. These factors can be used to determine the A/V control data 122 via a look-up table, state machine, algorithm or other logic.

In one mode of operation, the user interest analysis generator 124 analyzes sensor data 108 in the form of image data together with a skin color model used to roughly partition face candidates. The user interest analysis generator 124 identifies and tracks candidate facial regions over a plurality of images (such as a sequence of images of the image data) and detects a face in the image based on the one or more of these images. For example, user interest analysis generator 124 can operate via detection of colors in the image data. The user interest analysis generator 124 generates a color bias corrected image from the image data and a color transformed image from the color bias corrected image. The user interest analysis generator 124 then operates to detect colors in the color transformed image that correspond to skin tones. In particular, user interest analysis generator 124 can operate using an elliptic skin model in the transformed space such as a $C_b C_r$ subspace of a transformed $YC_b C_r$ space. In particular, a parametric ellipse corresponding to contours of constant Mahalanobis distance can be constructed under the assumption of Gaussian skin tone distribution to identify a facial region based on a twodimension projection in the $C_bC_r$ subspace. As exemplars, the 853,571 pixels corresponding to skin patches from the Heinrich-Hertz-Institute image database can be used for this purpose, however, other exemplars can likewise be used in broader scope of the present disclosure.

In an embodiment, the user interest analysis generator 124 tracks candidate facial regions over a sequence of images and detects a facial region based on an identification of facial motion and/or facial features in the candidate facial region over the sequence of images. This technique is based on 3D human face model that looks like a mesh. For example, face candidates can be validated for face detection based on the further recognition by user interest analysis generator 124 of facial features, like eye blinking (both eyes blink together, which discriminates face motion from others; the eyes are symmetrically positioned with a fixed separation, which provides a means to normalize the size and orientation of the head.), shape, size, motion and relative position of face, eyebrows, eyes, nose, mouth, cheekbones and jaw. Any of these facial features extracted from the image data can be used by user interest analysis generator 124 to detect each viewer that is present.

Further, the user interest analysis generator 124 can employ temporal recognition to extract three-dimensional features based on different facial perspectives included in the plurality of images to improve the accuracy of the detection and recognition of the face of each viewer. Using temporal information, the problems of face detection including poor lighting, partially covering, size and posture sensitivity can be partly solved based on such facial tracking. Furthermore, based on profile view from a range of viewing angles, more accurate and 3D features such as contour of eye sockets, nose and chin can be extracted.

Based on the number of facial regions that are detected, the number of users present can be identified. In addition, the user interest analysis generator 124 can identify the viewing angle of the users that are present based on the position of the detected faces in the field of view of the image data. In addition, the activities being performed by each user can be determined based on an extraction of facial characteristic data such as relative position of face, position and condition of the eyebrows, eyes, nose, mouth, cheekbones and jaw, etc.

In addition to detecting and identifying the particular users, the user interest analysis generator 124 can further analyze the faces of the users to generate viewer interest data 75 that indicates periods of viewer interest in particular content. In an embodiment, the image capture device is incorporated in the video display device such as a TV or monitor or is otherwise positioned so that the position and orientation of the users with respect to the video display device can be detected. In an embodiment the orientation of the face is determined to indicate whether or not the user is facing the video display device and whether the viewer is smiling. In this fashion, when the user's head is down or facing elsewhere, the user's level of interest in the content being displayed is low. Likewise, if the eyes of the user are closed for an extended period indicating sleep, the user's interest in the displayed content can be determined to be low. If, on the other hand, the user is facing the video display device and/or the position of the eyes and condition of the mouth indicate a heighten level of awareness, the user's interest can be determined to be high.

For example, a user can be determined to be watching closely if the face is pointed at the display screen and the eyes are open except during blinking events. Further other aspects of the face such as the eyebrows and mouth may change positions indicating that the user is following the display with interest. A user can be determined to be not watching closely if the face is not pointed at the display screen for more than a transitory period of time. A user can be determined to be engaged in conversation if the face is not pointed at the display screen for more than a transitory period of time, audio conversation is detected from one or more viewers, the face is pointed toward another user and/or if the mouth of the user is moving. A user can be determined to be sleeping if the eyes of the user are closed for more than a transitory period of time and/or if other aspects of the face such as the eyebrows and mouth fail to change positions over an extended period of time.

Figure 11:
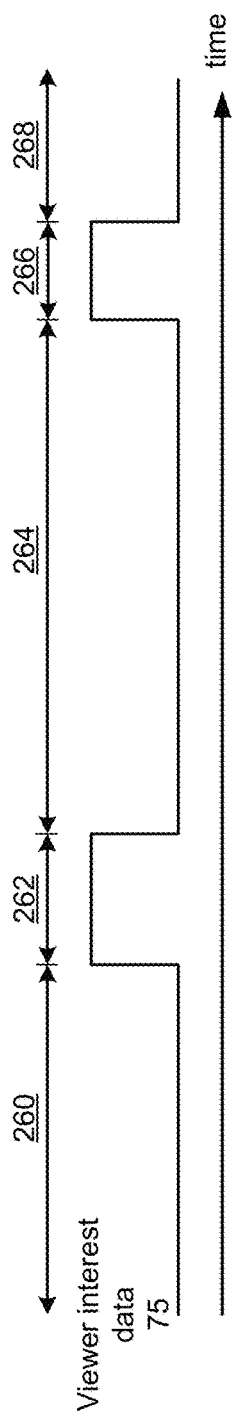
FIG. 11 presents a graphical diagram representation of interest data in accordance with an embodiment of the present invention.

FIG. 11 presents a graphical diagram representation of interest data in accordance with an embodiment of the present invention. In particular, a graph of viewer interest data 75 as a function of time, generated in conjunction with a system, such as system 125, is described in conjunction with functions and features of FIG. 5 that are referred to by common reference numerals. In this example, an analysis of input data 99 are used to generate binary interest data that indicate periods of time that the viewer has reached a high level of interest. In the example shown, the viewer interest data 75 is presented as a binary value with a high logic state (periods 262 and 266) corresponding to high interest and a low logic state (periods 260, 264 and 268) corresponding to a low level of interest or otherwise a lack of high interest. While a single set of viewer interest data 75 is shown, this viewer interest data 75 can represent a collective group of viewers of a single viewer. While not specifically shown, viewer interest data 75 of this kind can be separately generated and tracked for a plurality of different viewers.

In an embodiment, the timing of periods 262 and 266 can be correlated to time stamps of video signal 110 to select time-coded metadata 114 and or additional metadata 115 that based on the video content during these periods of high interest of the viewer or viewers. While the viewer interest data 75 is shown as a binary value, in other embodiments, viewer interest data 75 can be a multivalued signal that indicates a specific level of interest of the viewer or others and/or a rate of increase in interest of the viewer or viewers.

Figure 13:
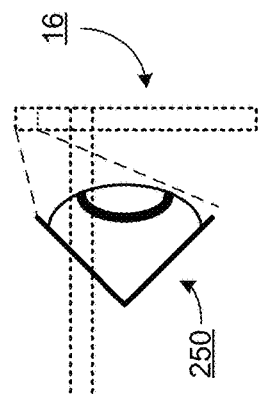
FIGS. 12 and 13 present pictorial diagram representations of components of a video system in accordance with embodiments of the present invention.
Figure 12:
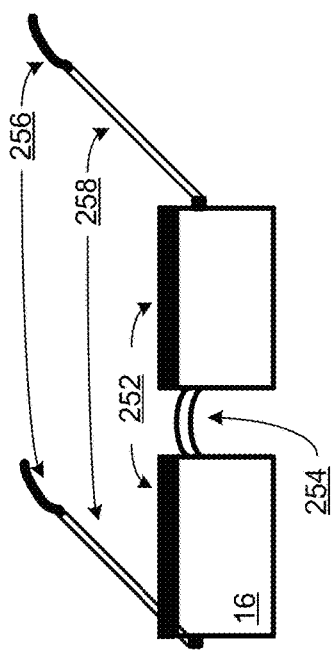

FIGS. 12 and 13 present pictorial diagram representations of components of a video system in accordance with embodiments of the present invention. In particular, a pair of glasses/goggles 16 are presented that can be used to implement system 125 or a component of video system 125.

The glasses/goggles 16, such as 3D viewing goggles or video display goggles include viewer sensors 106 in the form of perspiration and/or viewer sensors incorporated in the nosepiece 254, bows 258 and/or earpieces 256 as shown in FIG. 12. In addition, one or more imaging sensors implemented in the frames 252 can be used to indicate eye wideness and pupil dilation of an eye of the wearer 250 as shown in FIG. 13.

In an embodiment, the glasses/goggles 16 further include a short-range wireless interface such as a Bluetooth or Zigbee radio that communicates sensor data 108 via a network interface 100 or indirectly via a portable device 103 such as a smartphone, video camera, digital camera, tablet, laptop or other device that is equipped with a complementary short-range wireless interface. In another embodiment, the glasses/goggles 16 include a video player 104 with a heads up display, and some or all of the other components of the system 125.

Figure 15:
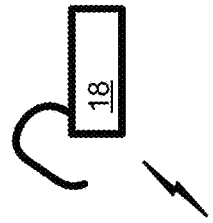
FIGS. 14 and 15 present pictorial diagram representations of video systems in accordance with embodiments of the present invention.
Figure 14:
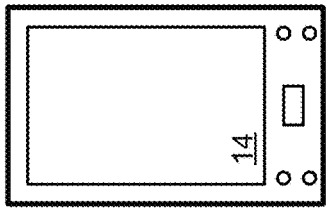

FIGS. 14 and 15 present pictorial diagram representations of video systems in accordance with embodiments of the present invention. In these embodiments, the smartphone 14 includes resistive or capacitive sensors in its cases that generate input data 99 for monitoring heart rate and/or perspiration levels of the user as they grasp the device. Further the microphone or camera in each device can be used a viewer sensor 106 as previously described.

In yet another embodiment, a Bluetooth headset 18 or other audio/video adjunct device that is paired or otherwise coupled to the smartphone 14 can include resistive or capacitive sensors in their cases that generate input data 99 for monitoring heart rate and/or perspiration levels of the user. In addition, the microphone in the headset 18 can be used to generate further input data 99.

Figure 16:
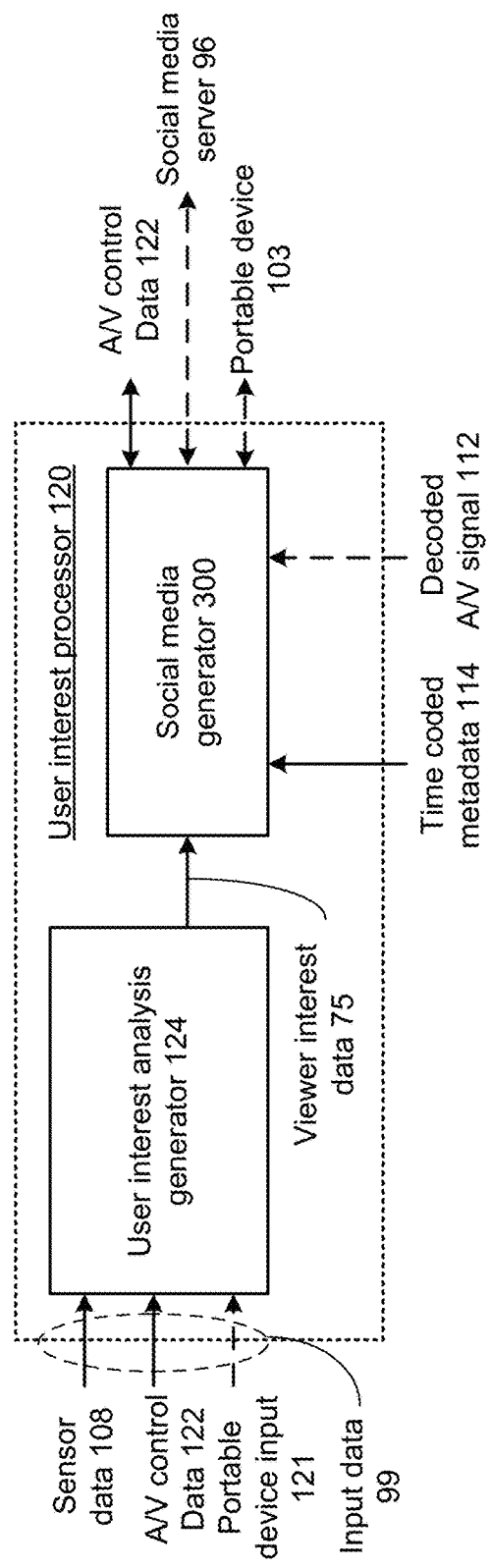
FIG. 16 presents a block diagram representation of a user interest processor in accordance with an embodiment of the present disclosure.

FIG. 16 presents a block diagram representation of a user interest processor in accordance with an embodiment of the present disclosure. In particular, a block diagram is presented in conjunction with a system, such as system 125, that is described in conjunction with functions and features of FIG. 5 referred to by common reference numerals.

The user interest processor 120 includes a user interest analysis (UIA) generator 124 configured to analyze input data 99 corresponding to the viewing of the video program via the A/V player 104 by one or more viewers. The input data 99 can include sensor data 108 generated by one or more viewer sensors 106, A/V commands and/or other A/V control data 122 from the A/V player 104, and/or portable device input 121 received from one or more portable devices 103. The UIA generator 124 analyzes the input data 99 to determine a period of interest corresponding to viewer or viewers and generate viewer interest data 75 that indicates this period of viewer interest.

The user interest processor 120 further includes a social media generator 300 configured to process viewer interest data 75 and time coded metadata 114 corresponding to the video program to automatically generate a social media post, corresponding to content of the video program during the period of interest, for posting to a social media account associated with the at least one viewer. In one mode of operation, the user interest processor 120 responds to periods of interest and communicates via network interface 100 with a social media server 96 to automatically generate posts relating to the content of video program that correlates to the viewer interest. The social media generator 300 can forward the social media post to the social media generator 300 via the network interface 100, in response to user input that indicates that the social media post is accepted by the at least one viewer.

In an embodiment, the social media post is sent via A/V control data 122 to be presented on the display device 105 associated with the A/V player 104. The display device 105 can concurrently display at least a portion of the video program in conjunction with the social media post. In addition or in the alternative, the social media post is presented on a display device associated with a portable device 103 associated with the at least one viewer. The portable device 103 can itself forward the social media post to a social media server 96, in response to a user input sent via A/V control data 122 that indicates that the social media post is accepted by the at least one viewer. In an embodiment, the social media post can contain text that includes information selected from the time-coded metadata, a still image or video captured from the decoded A/V signal 112, graphics related to the post and/or prompts to accept or reject the post.

Figure 17:
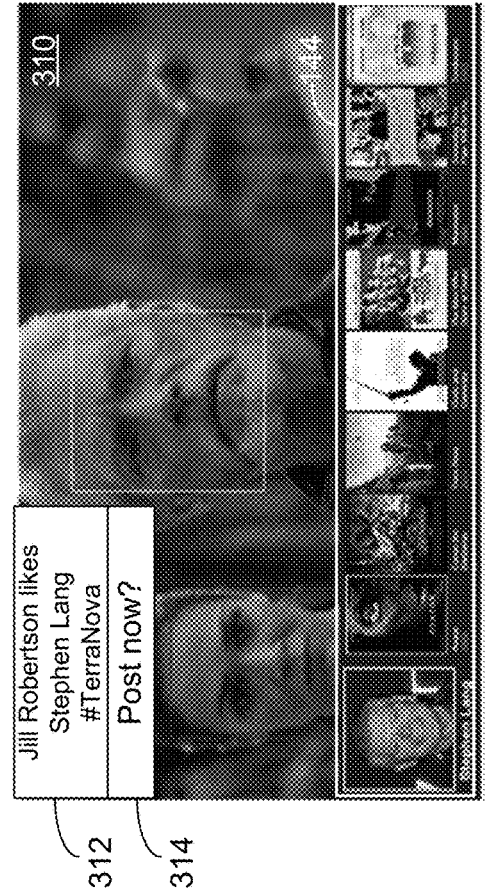
FIG. 17 presents a pictorial representation of a screen display in accordance with an embodiment of the present disclosure.

FIG. 17 presents a pictorial representation of a screen display in accordance with an embodiment of the present disclosure. In particular, a screen display generated in conjunction with a system, such as system 125, is described in conjunction with functions and features of FIG. 5 that are referred to by common reference numerals.

In the example shown, the social media post is sent via A/V control data 122 to be presented as the screen display 310 on the display device 105 associated with the A/V player 104. The display device 105 can concurrently display at least a portion of the video program in conjunction with the social media post. The social media post can contain text 312 that includes information selected from the time-coded metadata, a still image or video captured from the decoded A/V signal 112, time coded metadata 114 presented as graphics 144 related to the post and/or a prompt 314 to accept or reject the post.

Figure 18:
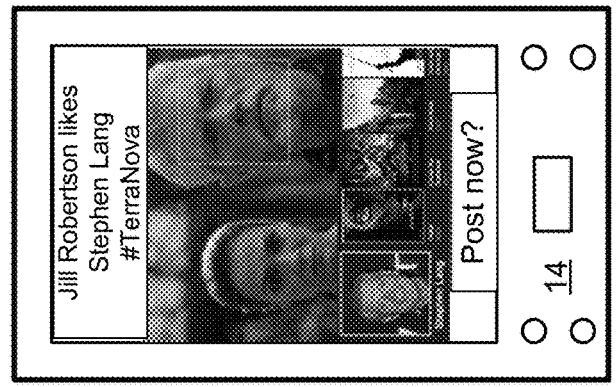
FIG. 18 presents a pictorial representation of a screen display in accordance with an embodiment of the present disclosure.

FIG. 18 presents a pictorial representation of a screen display in accordance with an embodiment of the present disclosure. In particular, a screen display generated in conjunction with a system, such as system 125, is described in conjunction with functions and features of FIG. 5 that are referred to by common reference numerals.

In the example shown, the social media post is presented on a display device associated with a portable device 103 associated with the at least one viewer. The portable device 103 can itself forward the social media post to a social media server 96, in response to user input sent via A/V control data 122 that indicates that the social media post is accepted by the at least one viewer. The social media post can contain text that includes information selected from the time-coded metadata, a still image or video captured from the decoded A/V signal 112, time coded metadata 114 presented as graphics related to the post and/or a prompt to accept or reject the post.

FIG. 19 presents a block diagram representation of a user interest processor in accordance with an embodiment of the present disclosure. In particular, a block diagram is presented in conjunction with a system, such as system 125, that is described in conjunction with functions and features of FIG. 5 referred to by common reference numerals.

The user interest processor 120 includes a user interest analysis (UIA) generator 124 configured to analyze input data 99 corresponding to the viewing of the video program via the A/V player 104 by one or more viewers. The input data 99 can include sensor data 108 generated by one or more viewer sensors 106, A/V commands and/or other A/V control data 122 from the A/V player 104, and/or portable device input 121 received from one or more portable devices 103. The UIA generator 124 analyzes the input data 99 to determine a period of interest corresponding to viewer or viewers and generate viewer interest data 75 that indicates this period of viewer interest.

In this example, the user interest processor 120 further includes an ad selection generator 302 configured to process the viewer interest data 75 and time coded metadata 114 corresponding to the video program to automatically retrieve an advertisement from a remote ad server 94, corresponding to content of the video program during the period of interest, to be sent as A/V control data 122 for display to the viewer by a display device, such as display device 105 or sent for display on a display device of a portable device 103. In an embodiment, the user interest analysis generator 124 can further recognize that at least one viewer is a particular subscriber or other user associated with either the A/V player 104 or one of the portable devices 103. The viewer interest data 75 can include an indication of a particular viewer or viewers that are interested. The ad selection generator 302 can correlate the particular viewer(s) with the viewer demographics and the advertisement can be automatically retrieved from the remote ad server based on not only the particular video content indicated to be of interest to the viewer or viewers but also the demographic data associated with the viewer(s).

FIG. 20 presents a pictorial representation of a screen display in accordance with an embodiment of the present disclosure. In particular, a screen display generated in conjunction with a system, such as system 125, is described in conjunction with functions and features of FIG. 5 that are referred to by common reference numerals.

In the example shown, the advertisement is sent via A/V control data 122 to be presented as the screen display 320 on the display device 105 associated with the A/V player 104. The display device 105 can concurrently display at least a portion of the video program in conjunction with the advertisement. The advertisement can contain text 322 that includes information selected from the time-coded metadata, a still image or video captured from the decoded A/V signal 112, time coded metadata 114 presented as graphics 144 related to the advertisement and/or a prompt 324 to receive further information.

FIG. 21 presents a pictorial representation of a screen display in accordance with an embodiment of the present disclosure. In particular, a screen display generated in conjunction with a system, such as system 125, is described in conjunction with functions and features of FIG. 5 that are referred to by common reference numerals.

In the example shown, the advertisement is presented on a display device associated with a portable device 103 associated with the at least one viewer. The advertisement can contain text that includes information selected from the time-coded metadata, a still image or video captured from the decoded A/V signal 112, time coded metadata 114 presented as graphics related to the advertisement and/or a prompt to receive further information.

Figure 22:
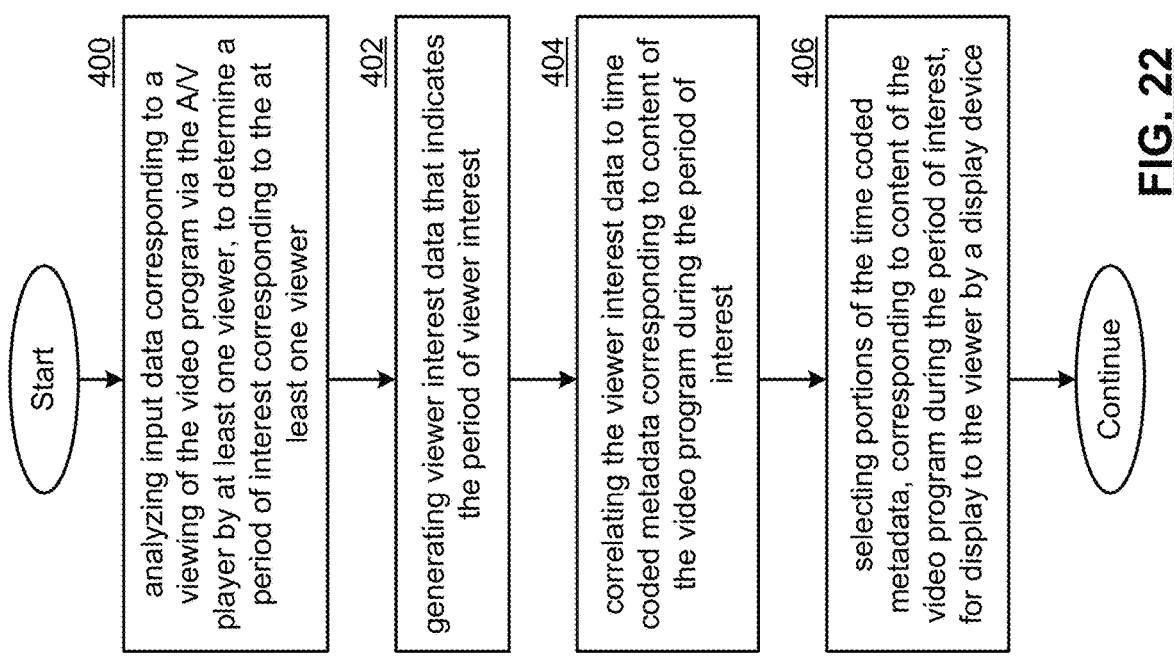
FIG. 22 presents a flowchart representation of a method in accordance with an embodiment of the present disclosure.

FIG. 22 presents a flowchart representation of a method in accordance with an embodiment of the present disclosure. In particular, a method is presented for use in with one or more features described in conjunction with FIGS. 1-21. Step 400 includes analyzing input data corresponding to a viewing of the video program via the A/V player by at least one viewer, to determine a period of interest corresponding to the at least one viewer. Step 402 includes generating viewer interest data that indicates the period of viewer interest. Step 404 includes correlating the viewer interest data to time coded metadata corresponding to content of the video program during the period of interest. Step 406 includes selecting portions of the time coded metadata, corresponding to content of the video program during the period of interest, for display to the viewer by a display device.

In an embodiment, the input data includes image data in a presentation area of the A/V player, and wherein the period of interest is determined by facial modeling and recognition that the at least one viewer has a facial expression corresponding to interest. The input data can include audio data in a presentation area of the A/V player, and wherein the period of interest is determined by recognition that utterances by the at least one viewer correspond to interest. The input data can include A/V control data from the A/V player, and wherein the period of interest is determined in response to a pause command of the A/V player. The input data can include sensor data from at least one biometric sensor associated with the at least one viewer, and wherein the period of interest is determined based on recognition that the sensor data indicates interest of the at least one viewer. The display device can be associated with the A/V player and wherein the display device concurrently displays at least a portion of the video program in conjunction with the selected portions of the time coded metadata. At least a portion of the input data can be generated by a portable device associated with the at least one viewer that is separate from the A/V player.

Figure 23:
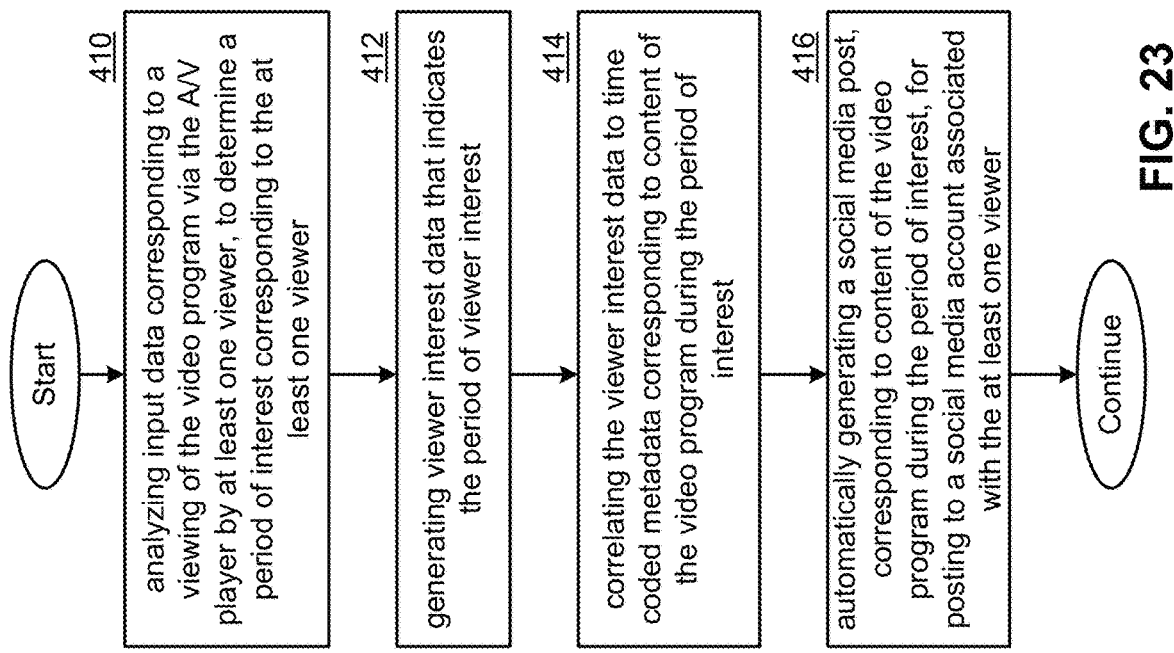
FIG. 23 presents a flowchart representation of a method in accordance with an embodiment of the present disclosure.

FIG. 23 presents a flowchart representation of a method in accordance with an embodiment of the present disclosure. In particular, a method is presented for use in with one or more features described in conjunction with FIGS. 1-22. Step 410 includes analyzing input data corresponding to a viewing of the video program via the A/V player by at least one viewer, to determine a period of interest corresponding to the at least one viewer. Step 412 includes generating viewer interest data that indicates the period of viewer interest. Step 414 includes correlating the viewer interest data to time coded metadata corresponding to content of the video program during the period of interest. Step 416 includes automatically generating a social media post, corresponding to content of the video program during the period of interest, for posting to a social media account associated with the at least one viewer.

In an embodiment, the input data includes image data in a presentation area of the A/V player, and wherein the period of interest is determined by facial modeling and recognition that the at least one viewer has a facial expression corresponding to interest. The input data can include audio data in a presentation area of the A/V player, and wherein the period of interest is determined by recognition that utterances by the at least one viewer correspond to interest. The input data can include A/V control data from the A/V player, and wherein the period of interest is determined in response to a pause command of the A/V player. The input data can include sensor data from at least one biometric sensor associated with the at least one viewer, and wherein the period of interest is determined based on recognition that the sensor data indicates interest of the at least one viewer. At least a portion of the input data can be generated by a portable device associated with the at least one viewer that is separate from the A/V player.

In an embodiment, the social media post is presented on a display device associated with the A/V player and wherein the display device concurrently displays at least a portion of the video program in conjunction with the social media post. The social media post can be presented on a display device associated with a portable device associated with the at least one viewer that is separate from the A/V player.

FIG. 24 presents a flowchart representation of a method in accordance with an embodiment of the present disclosure. In particular, a method is presented for use with one or more features described in conjunction with FIGS. 1-23. Step 420 includes analyzing input data corresponding to a viewing of the video program via the A/V player by at least one viewer, to determine a period of interest corresponding to the at least one viewer. Step 422 includes generating viewer interest data that indicates the period of viewer interest. Step 424 includes correlating the viewer interest data to time coded metadata corresponding to content of the video program during the period of interest. Step 426 includes automatically retrieving an advertisement from a remote ad server, corresponding to content of the video program during the period of interest, for display to the viewer by a display device.

In an embodiment, the input data includes image data in a presentation area of the A/V player, and wherein the period of interest is determined by facial modeling and recognition that the at least one viewer has a facial expression corresponding to interest. The method can further include recognizing at least one viewer and the advertisement can be automatically retrieved from the remote ad server based on demographic data associated with the at least one viewer. The input data can include audio data in a presentation area of the A/V player, and wherein the period of interest is determined by recognizing that utterances by the at least one viewer correspond to interest.

The input data can include audio data in a presentation area of the A/V player, and wherein the period of interest is determined by recognition that utterances by the at least one viewer correspond to interest. The input data can include A/V control data from the A/V player, and wherein the period of interest is determined in response to a pause command of the A/V player. The input data can include sensor data from at least one biometric sensor associated with the at least one viewer, and wherein the period of interest is determined based on recognition that the sensor data indicates interest of the at least one viewer. At least a portion of the input data can be generated by a portable device associated with the at least one viewer that is separate from the A/V player.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A system for use with an audio/video (A/V) player that plays a video program, the system comprising:
    a user interest analysis generator configured to analyze input data corresponding to a viewing of the video program via the A/V player by at least one viewer, to determine a period of interest corresponding to the at least one viewer and to generate viewer interest data that indicates the period of viewer interest; and
    a social media generator configured to process the viewer interest data and time coded metadata corresponding to the video program to automatically generate a social media post in response to the period of interest, the social media post including content of the video program during the period of interest, for posting to a social media account associated with the at least one viewer,
    wherein the input data includes image data in a presentation area of the A/V player, and wherein the user interest analysis generator determines the period of interest corresponding to the at least one viewer based on facial modeling and recognition that the at least one viewer has a facial expression corresponding to interest.

2. The system of claim 1 wherein the input data includes audio data in a presentation area of the A/V player, and wherein the user interest analysis generator determines the period of interest corresponding to the at least one viewer based on recognition that utterances by the at least one viewer correspond to interest.

3. The system of claim 1 wherein the input data includes A/V control data from the A/V player, and wherein the user interest analysis generator determines the period of interest corresponding a pause command of the A/V player.

4. The system of claim 1 wherein the input data includes sensor data from at least one biometric sensor associated with the at least one viewer, and wherein the user interest analysis generator determines the period of interest corresponding to the at least one viewer based on recognition that the sensor data indicates interest of the at least one viewer.

5. The system of claim 1 wherein the social media post is presented on a display device associated with the A/V player and wherein the display device concurrently displays at least a portion of the video program in conjunction with the social media post.

6. The system of claim 1 wherein the social media post is presented on a display device associated with a portable device associated with the at least one viewer that is separate from the A/V player.

7. The system of claim 6 wherein at least a portion of the input data is generated by a sensor included in the portable device.

8. The system of claim 6 wherein the portable device forwards the social media post to a social media server, in response to user input that indicates that the social media post is accepted by the at least one viewer.

9. The system of claim 1 wherein the social media generator forwards the social media post to a social media server via a network interface, in response to user input that indicates that the social media post is accepted by the at least one viewer.

10. A method with an audio/video (A/V) player that plays a video program, the method comprising:
    analyzing input data corresponding to a viewing of the video program via the A/V player by at least one viewer, to determine a period of interest corresponding to the at least one viewer;
    generating viewer interest data that indicates the period of viewer interest;
    correlating the viewer interest data to time coded metadata corresponding to content of the video program during the period of interest; and
    automatically generating a social media post in response to the period of interest, the social media post including content of the video program during the period of interest, for posting to a social media account associated with the at least one viewer,
    wherein the input data includes audio data in a presentation area of the A/V player, and wherein the period of interest is determined by recognition that utterances by the at least one viewer correspond to interest.

11. The method of claim 10 wherein the input data includes image data in a presentation area of the A/V player, and wherein the period of interest is determined by facial modeling and recognition that the at least one viewer has a facial expression corresponding to interest.

12. The method of claim 10 wherein the input data includes A/V control data from the A/V player, and wherein the period of interest is determined in response to a pause command of the A/V player.

13. The method of claim 10 wherein the input data includes sensor data from at least one biometric sensor associated with the at least one viewer, and wherein the period of interest is determined based on recognition that the sensor data indicates interest of the at least one viewer.

14. The method of claim 10 wherein the social media post is presented on a display device associated with the A/V player and wherein the display device concurrently displays at least a portion of the video program in conjunction with the social media post.

15. The method of claim 10 wherein the social media post is presented on a display device associated with a portable device associated with the at least one viewer that is separate from the A/V player.

* * * * *